INVENTOR.
YVES THIBAUT

United States Patent Office 3,553,548
Patented Jan. 5, 1971

3,553,548
PLURAL MOTOR SYSTEM FOR WASHING MACHINE
Yves Thibaut, Amiens, France, assignor, by mesne assignments, to U.S. Philips Corporation, New York, N.Y., a corporation of Delaware
Filed June 27, 1966, Ser. No. 560,565
Claims priority, application France, July 1, 1965, 23,141
Int. Cl. H02p 1/58
U.S. Cl. 318—102    7 Claims

ABSTRACT OF THE DISCLOSURE

An electric control device for a washing machine that includes first, second and third motors. The direction of rotation of the first motor is controlled by a reversing switch. The second motor rotates in one direction only. The third motor controls the reversing switch. The second and third motors are directly connected in series across the terminals of the supply voltage. A first switch is connected in series with the first motor across the series combination of the second and third motors. A second switch is connected in shunt with the third motor. The first and second switches are closed in mutually exclusive time intervals so that the first and second motors cannot be energized simultaneously.

---

The present invention relates to an electric locking device for a reversing switch employed in a washing machine. The washing machine includes at least two motors. The direction of rotation of the first motor is determined by the reversing switch, whereas the second motor has a predetermined direction of rotation.

It is known that washing machines comprise a drum which rotates for a given period of time by means of a motor, termed the washing motor, at a low speed, and then by means of a motor, termed the centrifugal motor, at a higher speed.

One of the difficulties involved in machines of this kind is caused by the commutation of the energy to be supplied to the washing motor and subsequently to the centrifugal motor, and by the requirement to switch off the reversing switch during the centrifugal operation. In the existing machines, the current supply to the washing motor and to the motor controlling the reversing switch is frequently interrupted before the centrifugal motor is connected to the supply. The machine is often blocked during the transition period because there is a brief period when all of the motors are de-energized.

The invention overcomes this disadvantage by connecting the elements in a novel circuit arrangement such that the motor controlling the reversing switch is continuously energized until the centrifugal motor is actually energized. In accordance with the invention, the motor controlling the reversing switch is connected in series with the second motor, and said series combination of the second motor and the motor controlling the reversing switch is connected through a switch to the terminals of the first motor.

The electric locking device will now be described more fully with reference to the accompanying drawing, in which.

Figure 1:
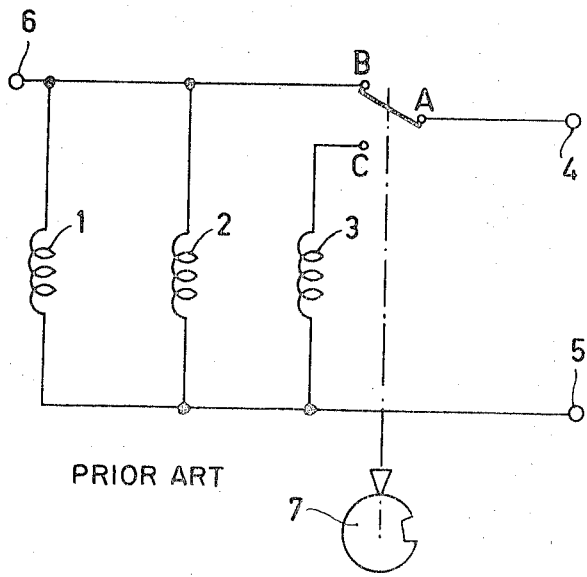
FIG. 1 shows a circuit diagram of a prior art washing machine control device, similar to that shown in United Kingdom Patent No. 963,963.

In FIG. 1 the motor controlling the reversing switch is represented by a winding 1, the washing motor by a winding 2 and the centrifugal motor by a winding 3. In practice, the washing motor and the centrifugal motor are usually a single motor having two separate energizing windings which normally cannot be safely energized at the same time. The supply voltage is available between the terminals 4 and 5 during the centrifugal operation and between the terminals 5 and 6 during the washing operation. The washing motor 2 and the centrifugal motor 3 can be switched on consecutively by means of a switch controlled by the cam 7 and having two positions AB and AC. The winding 1 of the motor controlling the reversing switch and the cam 7 is connected in parallel with the winding 2 of the washing motor. Known means (not shown) are provided in the washing machine to insure that the transfer of energy from the washing motor 2 to the centrifugal motor 3 can be accomplished only when the washing motor 2 drives the drum in the direction required for centrifugal operation. The machine described above has a serious drawback. As mentioned above, the switches AB and AC cannot be closed simultaneously. Therefore, when the lever is moved downwards or upwards, there is a transition point at which the lever arm that bridges the contacts of the switch remains in an intermediate position such that the switches AB and AC are both open. At this instant none of the motors are energized so that the whole machine is stopped and remains blocked in this position.

Figure 2:
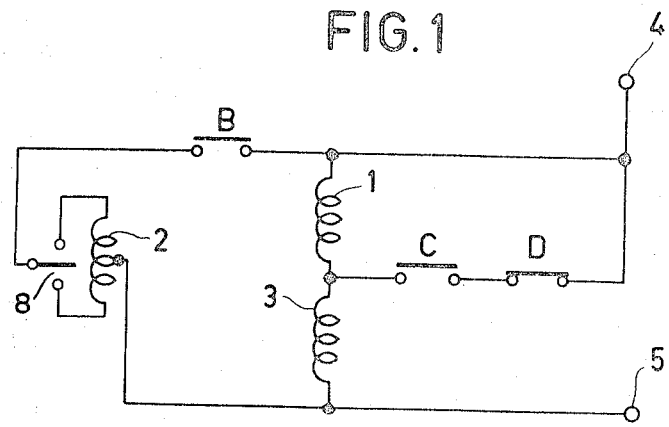
FIG. 2 shows a circuit diagram according to the invention.
Figure 3:
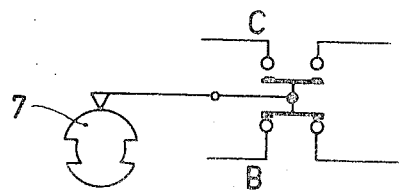
FIG. 3 shows a detail of the circuit according to the invention.

In FIG. 2, the parts fulfilling the same functions as those of FIG. 1 are designated by the same reference numerals. In this figure, elements B and C designate the switches. FIG. 3 shows an arrangement of the switch contacts which insures that when the switch B is opened by the cam 7, the switch C is closed. When a normal washing operation is performed, the switch B is shunted by one of the switches controlled by the inverter. The switch B is employed for the washing operations in a so-called special "rhythm," which means that the drum rotates at a low speed for about 5 seconds, for example, and stops, for example, for about 10 seconds before restarting either in the same sense or in the opposite sense. During the washing operation the switch D is open. At the beginning of the centrifugal operation the switch D is closed by the programmer or by hand.

According to the invention, the motor 1, controlling the reversing switch 8, is energized through the centrifugal motor 3, but the latter cannot start due to the high impedance of the winding of the motor 1. If a centrifugal operation has to be performed, the switch D has to be closed. The washing motor 2 remains connected to the supply voltage until the cam 7 opens the switch B and subsequently closes the switch C. At the instant switch C closes, the motor 1 is short-circuited and the centrifugal motor 3 can start. Since the motor 1 remains connected to the voltage supply until the switch C is closed, there are no dead spots and the machine cannot stall. At the termination of a centrifugal operation, only the switch D need be opened, so that the motor 1 is once again energized via the centrifugal motor 3.

What is claimed is:

1. An electric control device comprising, first, second and third individual motor windings, the direction of rotation of a first motor associated with said first winding being controlled by a reversing switch, the reversing switch being controlled by a motor associated with said third winding, means connecting said second and third windings in series circuit, input terminals for a source of supply voltage for said motor windings, and switching means having first and second switch members in circuit with said input terminals and said first and second motor windings, respectively, for coupling said supply voltage to said first and second windings in mutually exclusive time intervals.

2. A control device as claimed in claim 1 further comprising means directly connecting the series combination of said second and third windings across said input terminals.

3. A control device as claimed in claim 2 further comprising a control switch, and means directly connecting said control switch, said second switch member and said second winding in series across said input terminals.

4. An electric control device comprising, a pair of input terminals for a source of supply voltage, first, second and third individual motor windings, the direction of rotation of a first motor associated with said first winding being controlled by a reversing switch, the reversing switch being controlled by a motor associated with said third winding, means directly connecting said second and third windings in series across said input terminals, switching means controlled by the motor associated with said third winding and having first and second switch members that are closed in mutually exclusive time intervals, means connecting said first switch member and said first winding in series across said input terminals, and means connecting said second switch member in shunt with said third winding.

5. An electric control device for a washing machine comprising a first motor wherein the direction of rotation is determined by a reversing switch, a second motor having a given direction of rotation, said reversing switch being controlled by a third motor, means connecting said second motor in series with said third motor, first and second switches that are closed in mutually exclusive time intervals, means connecting the series combination of said second and third motors across the terminals of said first motor by means of said first switch, and means for applying a voltage to said first and second windings by means of said first and second switches, respectively.

6. A control device as claimed in claim 5 further comprising means directly coupling said voltage across the series combination of said second and third windings, and wherein said second switch is connected in shunt with said third motor.

7. In a washing machine having first, second and third individual motor windings for providing a low-speed reversible washing operation, a high-speed spin operation and periodic control of a reversing switch, respectively, the improvement comprising, a pair of input terminals for a source of supply voltage, means connecting said second and third motor windings in series across said input terminals, a first switch connected in series with said first motor winding across the series combination of said second and third motor windings, a second switch connected in shunt with said third winding, and means for closing said first and second switches in mutually exclusive time intervals thereby to prevent simultaneous effective energization of said first and second motor windings.

References Cited
UNITED STATES PATENTS

| | | | |
|---|---|---|---|
| 2,300,838 | 11/1942 | Dicke | 318—102 |
| 2,637,835 | 5/1953 | Davidson | 318—486 |
| 3,048,757 | 8/1962 | Comerford | 307—141.8 |
| 3,207,971 | 9/1965 | Willcox | 307—141.4 |
| 3,385,972 | 5/1968 | Bement | 307—141 |

FOREIGN PATENTS

| | | | |
|---|---|---|---|
| 963,963 | 7/1964 | Great Britain | 318—102 |

ORIS L. RADER, Primary Examiner

H. HUBERFELD, Assistant Examiner

U.S. Cl. X.R.

307—141.4, 141.8; 318—103